(12) United States Patent
Aoki et al.

(10) Patent No.: US 6,478,369 B1
(45) Date of Patent: Nov. 12, 2002

(54) SEAT AIR CONDITIONER HAVING MECHANISM FOLLOWING PASSENGER SEAT

(75) Inventors: Shinji Aoki, Chiryu (JP); Takeshi Yoshinori, Okazaki (JP); Yuichi Kajino, Nagoya (JP); Kazutoshi Nishizawa, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/629,272

(22) Filed: Jul. 31, 2000

(30) Foreign Application Priority Data

Aug. 3, 1999 (JP) ............................ 11-220246

(51) Int. Cl.$^7$ .............................. A47C 31/00
(52) U.S. Cl. ..................... 297/180.13; 297/180.14; 297/180.1; 297/344.13; 297/344.18; 297/344.17
(58) Field of Search ................... 297/180.1, 180.13, 297/180.14, 344.13, 344.17, 344.18

(56) References Cited

FOREIGN PATENT DOCUMENTS

| EP | 411-375 A | * | 2/1991 | ............ 297/180.13 |
|----|-----------|---|--------|------------------------|
| JP | U-59-164552 |   | 11/1984 |                        |
| JP | U-60-58053  |   | 4/1985  |                        |
| JP | U-2-31542   |   | 2/1990  |                        |
| JP | A-5-139155  |   | 6/1993  |                        |
| JP | A-10-278556 |   | 10/1998 |                        |

* cited by examiner

*Primary Examiner*—Lanna Mai
*Assistant Examiner*—Dennis L. Dorsey
(74) *Attorney, Agent, or Firm*—Harness, Dickey & Pierce, PLC (57) ABSTRACT

A seat air duct includes a floor duct fixed to the floor surface of vehicle cabin and flexible ducts. The upper wall of the floor duct is partially formed by flexible slide walls. The flexible slide walls are formed in an accordion and stretch and contract to follow a front-back stroke of a front seat. The flexible ducts stretch and contract to follow a vertical stroke of the front seat. In this way, since the flexible slide walls and the flexible ducts are independently provided, the seat air-conditioning unit effectively follows the front-back and vertical strokes of the passenger seat, thereby improving a seat air-conditioning performance.

14 Claims, 6 Drawing Sheets

SEAT AIR CONDITIONER HAVING MECHANISM FOLLOWING PASSENGER SEAT

CROSS REFERENCE TO RELATED APPLICATION

This application is based on and incorporates herein by reference Japanese Patent Application No. Hei. 11-220246 filed on Aug. 3, 1999.

BACKGROUND OF THE INVENTION

1. Field of the Invention

The present invention relates to a seat air conditioner of an automotive air conditioning system.

2. Description of Related Art

A front seat of a vehicle includes a reclining mechanism and a seat slide mechanism to adjust a seat position for a passenger. The reclining mechanism adjusts the reclining position of the seat back of the front seat, and the seat slide mechanism adjusts the seat position in the front and back direction.

Figure 8:
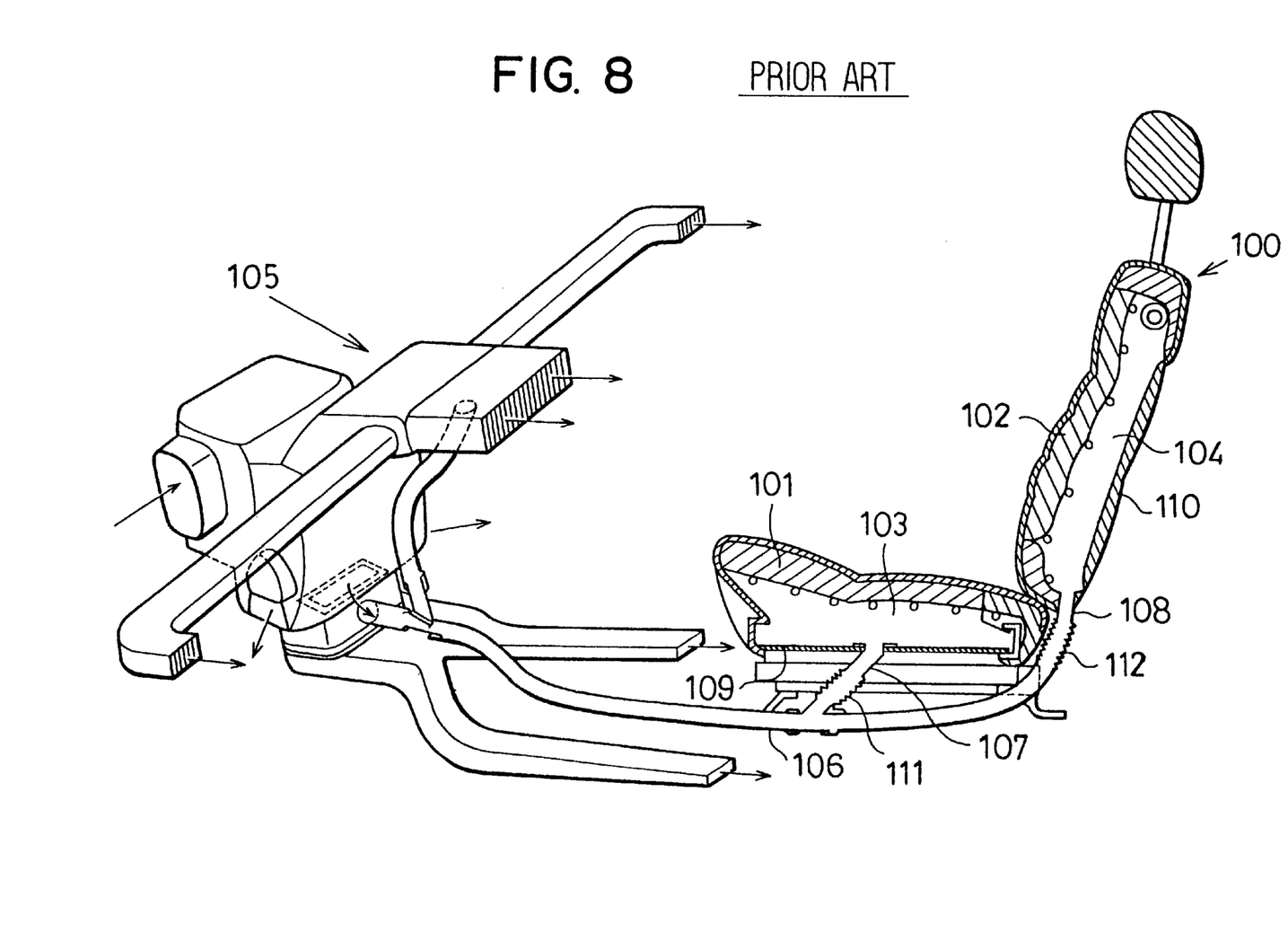
FIG. 8 is a schematic view of a prior art seat air conditioner.

As shown in FIG. 8, JP-U-59-164552 and JP-U-60-58053 disclose conventional seat air conditioners directly leading conditioned air to a front seat 100. Each seat air conditioner includes an air chamber 103 in a seat cushion 101, an air chamber 104 in a seat back 102, a connection duct 106, rotary ducts 107, 108, partition plates 109, 110, and flexible ducts 111, 112. The conditioned air is led from a front air-conditioner 105, through the connection duct 106, and into the air chambers 103, 104. The rotary ducts 107, 108 rotate with respect to the partition plates 109, 110 respectively, and the flexible duct 111, 112 stretch and contract for allowing the seat air conditioner to follow the front-back stroke of the front seat 100.

In a recent vehicle, a lift mechanism and a vertical adjust mechanism are provided. The lift mechanism adjusts the front-end height of the seat cushion for improving the foot area feeling of the passenger. The vertical adjust mechanism adjusts the seat position in the vertical direction. However, since the conventional seat air conditioner adjusts its position by only rotating the rotary ducts 107, 108, and stretching and contracting the flexible ducts 111, 112, the conventional seat air conditioner does not follow the vertical stroke of the front seat 100.

When the flexible ducts 111, 112 are formed in an accordion pipe, the flexible ducts 111, 112 are partially bent and crushed due to the front-back and vertical strokes of the seat cushion 101, so that the air passages therein are narrowed to increase the pressure loss. Thus, the heat loss of the conditioned air is increased, thereby lessing the cooling and heating performance of the air conditioner. Further, it is necessary to prepare a supplemental space where the flexible ducts 111, 112 will bend, and to enlarge a space between the floor surface and a seat frame supporting the seat cushion 101. Thus, there are still disadvantages about assembly and layout performances of the seat air duct under the front seat 100.

SUMMARY OF THE INVENTION

An object of the present invention is to provide a seat air conditioner effectively following front-back and vertical strokes of a passenger seat to improve a seat air conditioning performance.

According to a first aspect of the present invention, a seat air-conditioning unit includes a first mechanism following a substantial front-back stroke of the passenger seat and a second mechanism following a substantial vertical stroke of the passenger seat independently. Thus, the seat air-conditioning unit effectively follows the front-back and vertical strokes of the passenger seat, so that a seat air duct is not bent nor squashed abnormally.

Since the seat air duct does not transform abnormally, an air passage formed in the seat air duct is not narrowed, thereby preventing a pressure loss at the seat air duct and improving the seat air conditioning performance.

Further, it is not necessary to prepare a supplemental space under the passenger seat, where the seat air duct will bend, thereby improving assembly and layout performances of the seat air-conditioning unit and the seat air duct 4.

According to a second aspect of the present invention, a seat air conditioning unit includes an additional seat air-conditioning blower fan introducing the conditioned air toward the passenger seat. Thus, even when the amount of conditioned air from a front air conditioning unit is not sufficient, the conditioned air is efficiently introduced toward the passenger seat. As a result, air conditioning feeling for a passenger is further improved.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

First Embodiment

Figure 1:
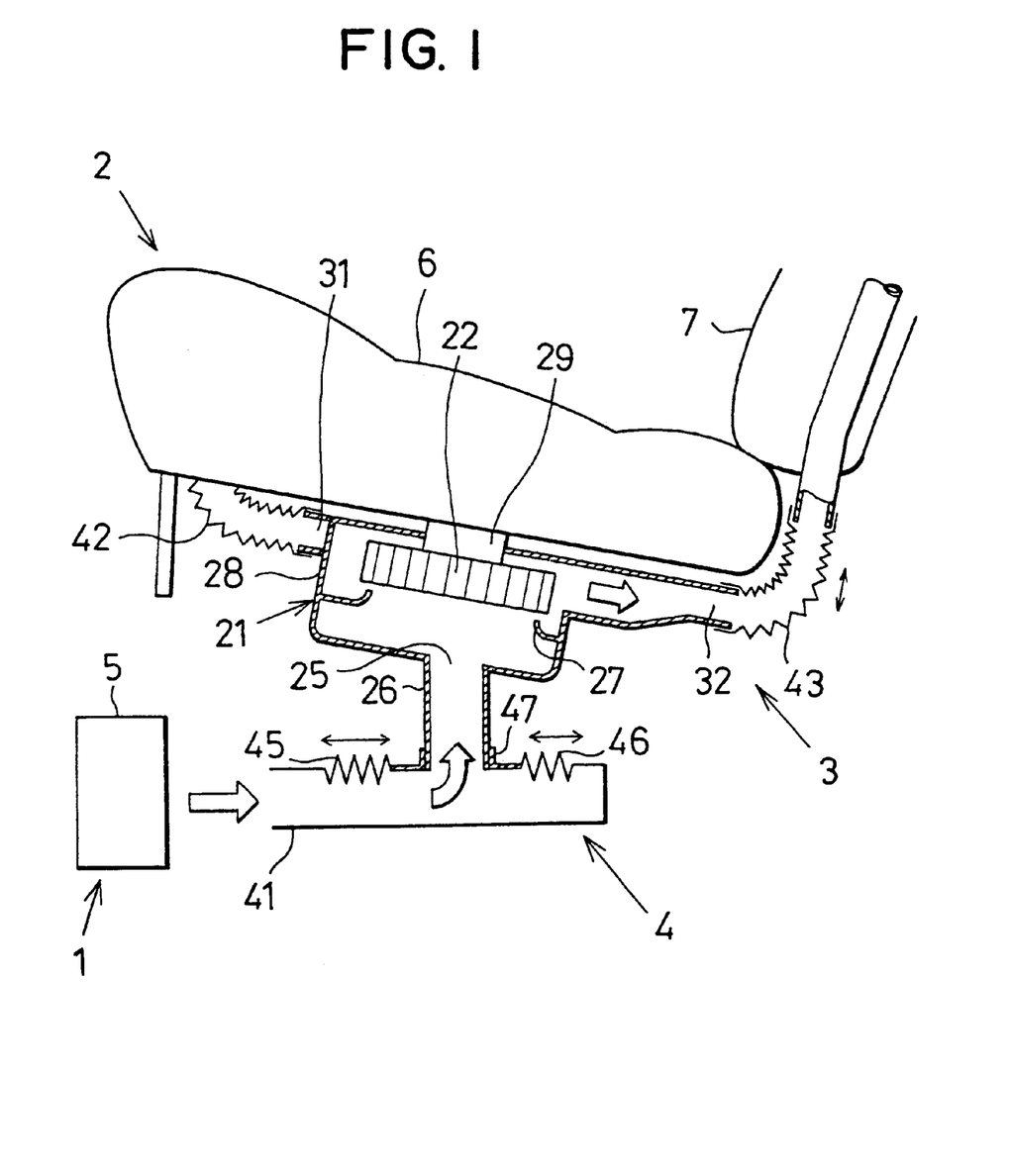
FIG. 1 is a schematic cross-sectional view of a seat air-conditioner (first embodiment)
Figure 2:
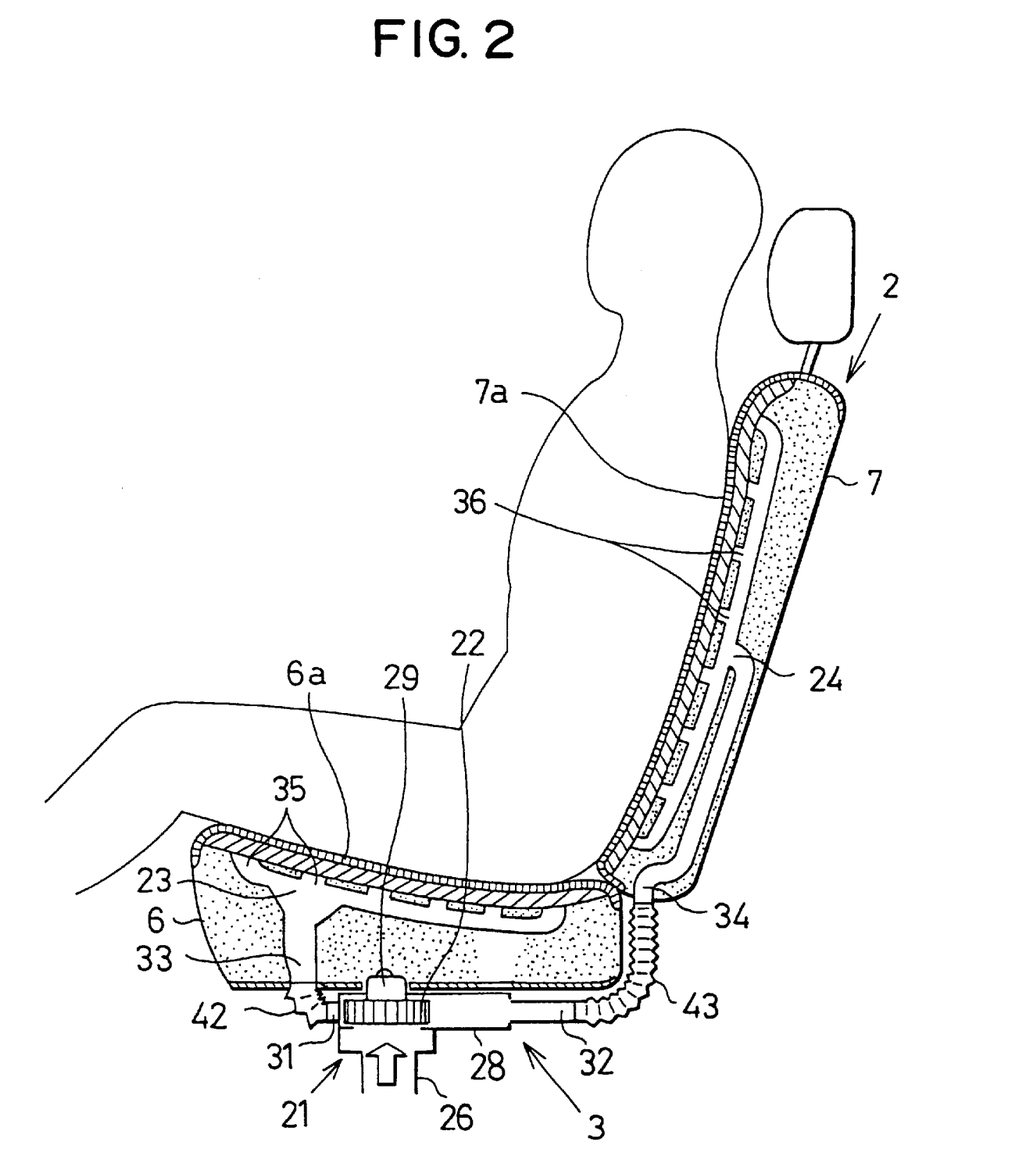
FIG. 2 is a cross-sectional view of a seat air-conditioning unit (first embodiment)

In the first embodiment, as shown in FIGS. 1 and 2, a vehicle seat air conditioner includes a front air-conditioning unit 1, a seat air-conditioning unit 3, and a seat air duct 4. The front air-conditioning unit 1 conditions the air inside a vehicle cabin. The seat air-conditioning unit 3 directly leads the conditioned air to the front seats (drivers seat, passenger seat) 2 of the vehicle. The seat air duct 4 leads the conditioned air from the front air-conditioning unit 1 to the seat air-conditioning unit 3.

The front air-conditioning unit 1 includes a front air duct 5, a front air-conditioning blower fan (not illustrated), an evaporator (not illustrated), and a heater core (not illustrated). The front air duct 5 has an air outlet through which the conditioned air blows into the vehicle cabin. The front air-conditioning blower fan generates air flowing through the front air duct 5 and into the vehicle cabin. The evaporator cools the air passing therethrough, and the heater core heats the air passing therethrough.

A rear foot duct (not illustrated) is connected to the front air duct 5. The rear foot duct leads the conditioned air to the rear seat area of the vehicle. Either of the cooled air having passed through the evaporator or the heated air having passed through the heater core is introduced into the rear foot duct.

The front seat 2 includes a seat cushion 6 and a seat back 7. In the seat cushion 6, a flat spring or a coil spring is attached on a seat frame made of metal or resin, for improving the cushion performance thereof. The seat cushion 6 and the seat back 7 are respectively covered with seat covers 6a, 7a, having permeability.

The front seat 2 further includes a reclining mechanism, a seat slide mechanism, a lift mechanism, and a vertical seat adjuster. The reclining mechanism adjusts the reclining position of the seat back 7. The seat slide mechanism adjusts the seat position in the front and back direction (for example, 240 mm). The lift mechanism adjusts the front end height of the seat cushion 6 for improving the foot area feeling of passenger. The vertical adjust mechanism adjusts the seat position in the vertical direction (for example, 92 mm). These mechanisms operate manually or electrically.

The seat air-conditioning unit 3 includes a blower unit casing 21, a seat air-conditioning centrifugal blower fan 22, and seat air conditioning ducts 23, 24 (see FIG. 2). The blower unit casing 21 directly leads the conditioned air to the front seat 2. The seat air-conditioning blower fan 22 is installed inside the blower unit casing 21 and generates air flowing toward the front seat 2. The seat air conditioning ducts 23, 24 are provided in the front seat 2.

The vertical seat adjuster operates the seat frame disposed under the seat cushion 6 to go up and down. The blower unit casing 21 is attached to the vertical seat adjuster. The blower unit casing 21 includes a connection hole 25 at the bottom thereof, a cylindrical connection duct 26, and a bell-mouth shaped air inlet 27, and a scroll member 28. The connection duct 26 communicates with the air inlet 27 and extends downwardly from the connection hole 25.

The seat air-conditioning fan 22 is installed in the scroll portion 28 of the blower unit casing 21, and driven by a blower motor 29. The seat air-conditioning fan 22 suctions the conditioned air from the air inlet 27 and discharges the air into the seat air-conditioning ducts 23, 24.

As shown in FIG. 2, the seat duct 23 is formed in the seat cushion 6, and the seat duct 24 is formed in the seat back 7. The seat duct 23 has an air inlet 33 communicating with the air outlet 31 of the blower unit casing 21, and a plurality of nozzles 35 extending to the seat surface of the seat cushion 6. Similarly, the seat duct 24 has an air inlet 34 communicating with the air outlet 32 of. the blower unit casing 21, and a plurality of nozzles 36 extending to the seat surface of the seat back 7.

The seat air duct 4 includes a floor duct 41 and flexible ducts 42, 43. The floor duct 41 is disposed along the floor surface of the vehicle cabin and extends in the front and back direction. The floor duct 41 is fixed to the floor surface of the cabin and the suction side thereof is connected to the air outlet of the front air-conditioning unit 1. The flexible ducts 42, 43 are positioned vertically and perpendicularly to the floor duct 41 and stretch and contract. The flexible duct 42 connects the air outlet 31 of the blower unit casing 21 to the air inlet 33 of the seat air duct 23, and the flexible duct 43 connects the air outlet 32 to the air inlet 34 of the seat air duct 24.

The upper wall of the floor duct 41 is partially formed by flexible slide walls 45, 46. A discharge nozzle 47 is provided between the flexible slide walls 45 and 46, and connects to the connection duct 26 of the blower unit casing 21. The flexible slide walls 45, 46 are made of resin and formed in an accordion. The slide walls 45, 46 horizontally stretch and contract in accordance with the front-back stroke of the front seat 2. The flexible ducts 42, 43 are just examples of a vertical duct in the present invention. The flexible ducts 42, 43 are made of resin and formed in an accordion pipe, and vertically stretch and contract in accordance with vertical the stroke of the front seat 2. Here, the flexible duct 43 additionally stretches and contracts in accordance with the tilt position of the seat back 7 due to a reclining mechanism operation.

An operation of the vehicle seat air-conditioner in the first embodiment will be explained.

When the front air-conditioning unit 1 and the seat air-conditioning unit 3 are switched on, the front air-conditioning blower fan and the seat air-conditioning blower fan 22 start to work.

The conditioned air including cooled air having passed through the evaporator and heated air having passed through the heater core are introduced from the front air ducts into the floor duct 41. The seat air-conditioning blower fan 22 draws the conditioned air from the floor duct 41, through the discharge nozzle 47, the connection duct 26, the connection hole 25 and the air inlet 27, and into the scroll member 28.

The conditioned air introduced into the scroll member 28 is distributed through the flexible ducts 42, 43 and into the seat air ducts 23, 24. The conditioned air introduced into the seat air duct 23 is discharged through the plurality of nozzles 35 and from the seat surface of the seat cushion 6. Similarly, the conditioned air introduced into the seat air duct 24 is discharged through the plurality of nozzles 36 and from the seat surface of the seat back 7.

In this way, the air conditioned in the front air-conditioning unit 1 is directly discharged toward the passenger from the seat surfaces of the seat cushion 6 and the seat back 7, thereby improving the feelings of the passenger.

When the front seat 2 slides in the front and back direction, the blower unit casing 21 fixed to the seat adjuster and the seat air ducts 23, 24 slide with the front seat 2.

That is, the flexible slide walls 45, 46 stretch and contract in accordance with the front-back stroke of the front seat 2 to allow the discharge nozzle 27 to slide horizontally.

When the front seat 2 moves vertically, the seat air ducts 23, 24 move vertically with the front seat 2. At this time, the blower unit casing 21 does not move.

That is, the flexible ducts 42, 43 stretch and contract in accordance with the vertical stroke of the front seat 2. Thus, the air outlet 31 of the blower unit casing 21 maintains communication with the air inlet 33 of the seat air duct 23. Similarly, the air outlet 32 maintains communication with the air inlet 34.

As described above, in the vehicle seat air conditioner of the present embodiment, the seat air duct 4 leads the conditioned air from the front air-conditioning unit 1 to the seat air-conditioning unit 3. The seat air duct 4 includes flexible slide walls 45, 46 which stretch and contract in accordance with the front-back stroke of the front seat 2, and flexible ducts 42, 43 which stretch and contract in accordance with the vertical stroke of the front seat 2.

That is, a mechanism following the horizontal slide of the front seat 2 and a mechanism following the vertical movement of the front seat 2 are independently provided. Thus, the seat air duct 4 is not bent nor squashed abnormally.

Accordingly, since the seat air duct 4 does not transform abnormally, the air passage inside the seat air duct 4 is not narrowed, thereby preventing the pressure loss at the seat air duct 4 and improving the seat air conditioning performance.

Further, it is not necessary to prepare a supplemental space under the front seat 2, where the seat air duct 4 will bend. Thus, assembling and layout performances of the seat air-conditioning unit 3 and the seat air duct 4 are improved. Especially, the space needed for installation of the seat air-conditioning unit 3 and the seat air duct 4 is reduced. Thus, the remaining space between the floor surface of the cabin and the seat frame is effectively used to install other devices.

Second Embodiment

Figure 3:
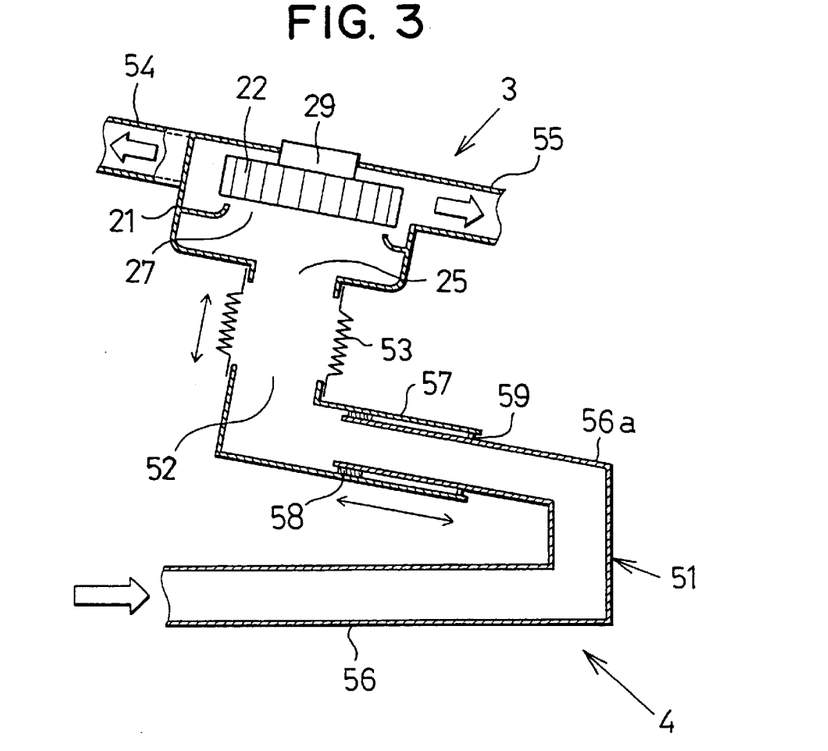
FIG. 3 is a schematic cross-sectional view of a seat air conditioner (second embodiment)

According to the second embodiment, as shown in FIG. 3, a seat air duct 4 includes a double pipe air duct 51 and a flexible duct 53. The flexible duct 53 connects an air outlet 52 of the air duct 51 to the connection hole 25 of the blower unit casing 21. A connection duct 54 is provided between the air outlet of the blower unit casing 21 and the seat air duct 23, and a connection duct 55 is provided between the air outlet of the blower unit casing 21 and the seat air duct 24.

The air duct 51 includes a floor duct 56, a slide duct 57, a felt seal 58, and a pin 59. As denoted by arrow in FIG. 3, the slide duct 57 slides along a tilt portion 56a of the floor duct 56 in accordance with the front-back stroke of the front seat 2. The felt seal 58 is provided between the floor duct 56 and the slide duct 57 to prevent an air leak therefrom. The pin 59 is provided at the end of the slide duct 57 to prevent the slide duct 57 from falling out of the tilt portion 56a of the floor duct 56.

The flexible duct 53 is just one example of a vertical duct of the present invention. The flexible duct 53 is made of resin and formed like an accordion. The flexible duct 53 stretches and contracts in accordance with the vertical stroke of the front seat 2.

Third Embodiment

Figure 4:
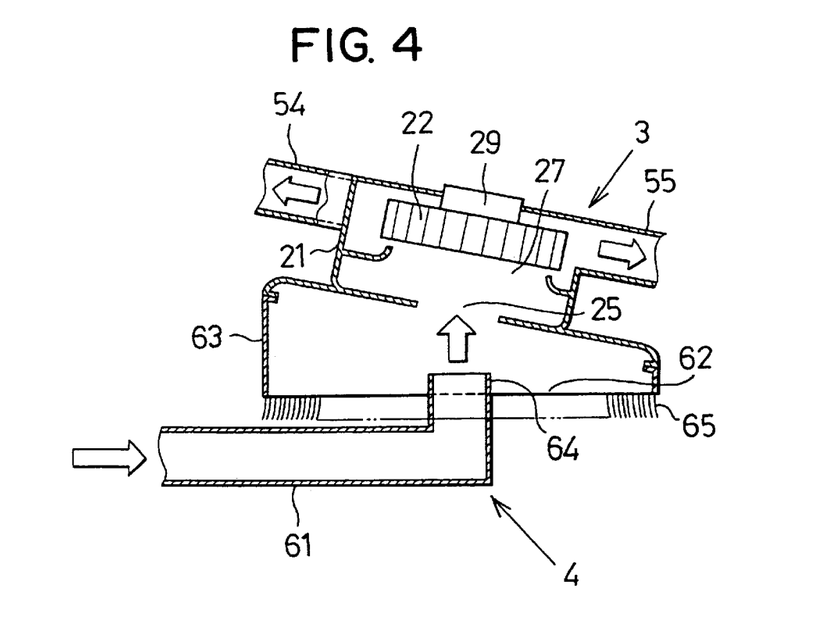
FIG. 4 is a schematic cross-sectional view of a seat air-conditioner (third embodiment)
Figure 5:
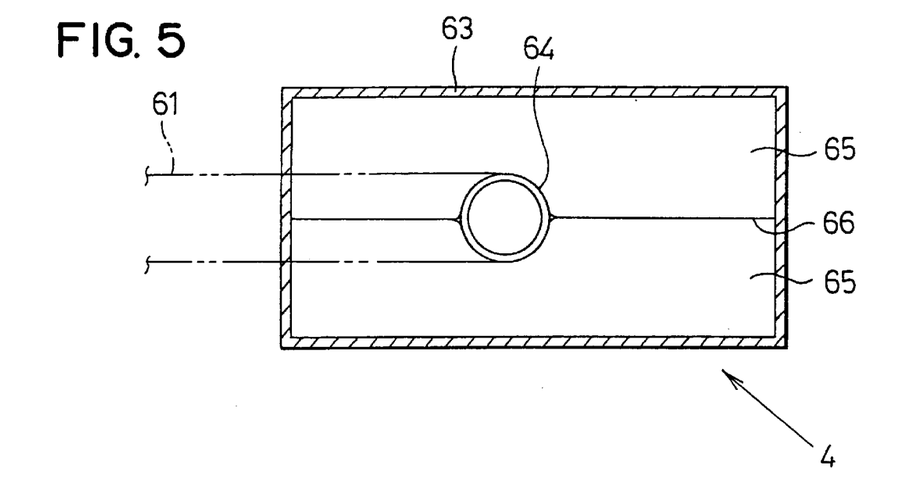
FIG. 5 is a cross-sectional view showing a connection duct, a secondary flow grille, and a seal member (third embodiment)

According to the third embodiment, as shown in FIGS. 4 and 5, the seat air duct 4 includes a floor duct 61 and a connection duct 63. The floor duct 61 is connected to the air outlet of the front air-conditioning unit 1 and fixed to the floor surface of the vehicle cabin. The connection duct 63 is connected to the connection hole 25 of the blower unit casing 21 of the seat air-conditioning unit 3, and has an air inlet 62.

The floor duct 61 includes a secondary flow grille 64 at the air outlet thereof. The secondary flow grille 64 opens and faces upwardly, and the top end thereof is inserted into the air inlet 62 of the connection duct 63. The secondary flow grille 64 is formed in a discharge nozzle to generate a secondary air flow, and allows the air inlet 62 to slide horizontally and vertically.

In the present embodiment, the connection duct 63 horizontally moves with respect to the secondary flow grille 64 in accordance with the front-back stroke of the front seat 2. Further, the connection duct 63 vertically moves with respect to the secondary flow grille 64 in accordance with the vertical stroke of the front seat 2.

A seal member 65 such as a brush or a felt is provided between the air inlet 62 and the secondary flow grille 64. The seal member 65 prevents the air from leaking from around the secondary flow grille 64 when the connection duct 63 moves. Here, the seal member has a slit 66 at the center thereof to allow the seal member 65 to slide with respect to the secondary flow grille 64.

Fourth Embodiment

Figure 6A:
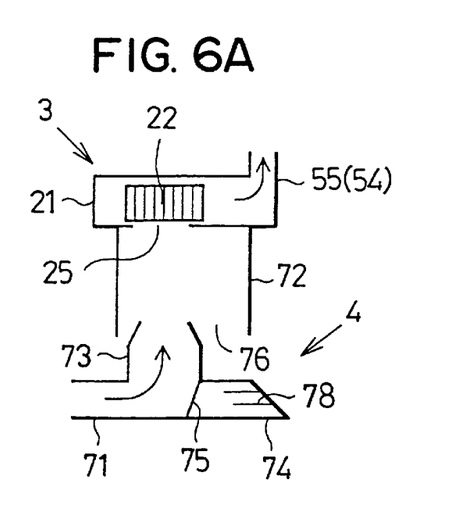
FIG. 6A is a schematic cross-sectional view of a seat air conditioner (fourth embodiment)

According to the fourth embodiment, the seat air-conditioning unit 3 included a blower unit casing 21 which contains the seat air-conditioning centrifugal blower fan 22 fixed to the seat frame or a seat adjuster which is provided under the seat cushion 6.

Figure 6B:
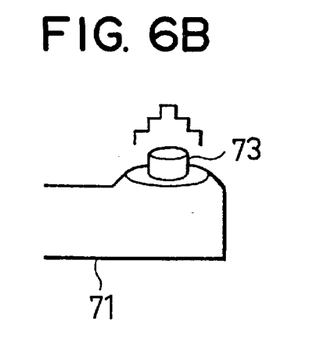
FIG. 6B is a schematic view showing a first example of a secondary flow grille (fourth embodiment)
Figure 6C:
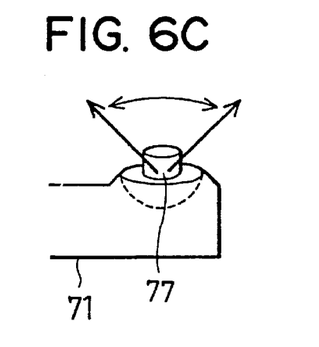
FIG. 6C is a schematic view showing a second example of a secondary flow grille (fourth embodiment)

As shown in FIGS. 6A–6C, a seat air duct 4 is connected to the air outlet of the front air-conditioning unit 1. The seat air duct 4 includes a floor duct (first air duct of the present invention) 71 and a rubber cover (second air duct of the present invention) 72. The floor duct 71 is fixed to the floor surface of the vehicle cabin. The rubber cover 72 is a good thermal insulator and is connected to the connection hole 25 of the blower unit casing 21. The rubber cover 72 may be formed in a circular cylindrical shape, a cone cylindrical shape, a polygon cylindrical shape, a rectangle cylindrical shape, or the like.

The floor duct 71 includes a secondary flow grille 73 at the air outlet thereof, and the secondary flow grille 73 is inserted into the rubber cover 72.

As in the third embodiment, the rubber cover 72 horizontally moves with respect to the secondary flow grille 73 in accordance with the front-back stroke of the front seat 2.

Further, the rubber cover 72 vertically moves with respect to the secondary flow grille 73 in accordance with the vertical stroke of the front seat 2.

Further, the floor duct 71 includes a rear foot duct 74 and a mode switching door 75. The rear foot duct 74 includes a louver 78 at the air outlet thereof. The rear foot duct 74 leads the heated air to the foot area of a passenger seated on a rear seat. The mode switching door 75 selects a seat air conditioning mode which leads the conditioned air from the front air-conditioning unit 1 to the secondary flow grille 73, or a rear heater mode which leads the heated air from the front air-conditioning unit 1 to the rear foot duct 74.

As shown in FIG. 6B, when the flow speed of the conditioned air blowing from the secondary flow grille 73 increases, the amount of primary air flow (air inside the cabin) suctioned through an air inlet 76 between the secondary flow grille 73 and the rubber cover 72 increases. Thus, the air temperature effectively reaches the air inlet 76. For example, the air flow area of the secondary flow is about one-third of the air flow area of the primary flow, and the flow speed of the secondary flow is about one-half of the flow speed of the primary flow to improve the air thermal transfer.

Here, as shown in FIG. 6C, the secondary flow grille 73 may be altered by a variable direction secondary flow grille 77 for discharging the conditioned air to chase the stroke of the front seat 2.

In the present embodiment, the floor duct 71 is not connected to the rubber cover 72, so that the seat air duct 4 is not influenced by the front-back and vertical strokes of the front seat 2.

That is, the seat air duct 4, formed by the floor duct 71 and the rubber cover 72, does not abnormally transform. Thus, the air passage inside the seat air duct 4 is not narrowed, thereby preventing the pressure loss at the seat air duct 4 and improving the seat air conditioning performance.

Further, it is not necessary to prepare a supplemental space under the front seat 2, where the seat air duct 4 will bend. Thus, assembly and layout performances of the seat air-conditioning unit 3 and the seat air duct 4 are improved.

Fifth Embodiment

Figure 7A:
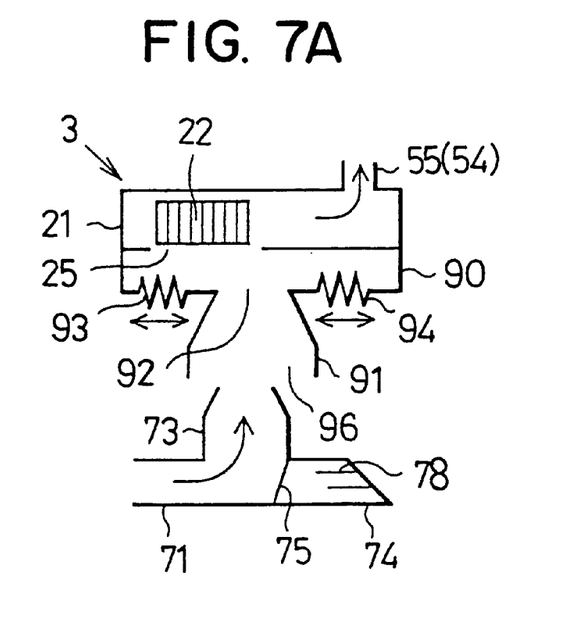
FIG. 7A is a schematic view showing a first example of a seat air-conditioner (fifth embodiment)

According to the fifth embodiment, the seat air-conditioning unit 3 includes the blower unit casing 21 which contains the seat air-conditioning centrifugal blower fan 22 fixed to the seat frame or a seat adjuster which is provided under the seat cushion 6.

As shown in FIG. 7A, a connection duct (second air duct of the present invention) 90 is connected to the connection hole 25 of the blower unit casing 21. The connection duct 90 is made of flexible rubber and is a good thermal insulator. The connection duct 90 includes a suction cylinder 91, and flexible slide walls 93, 94. The suction cylinder 91 is cone cylindrically formed, is disposed under the front seat 2, and has an air inlet 96. The flexible slide walls 93, 94 are provided at both sides of the air outlet 92 of the suction cylinder 91.

The flexible slide walls 93, 94 partially form the bottom wall of the connection duct 90 and are formed like an accordion to stretch and contract in accordance with the front-back stroke of the front seat 2.

Figure 7B:
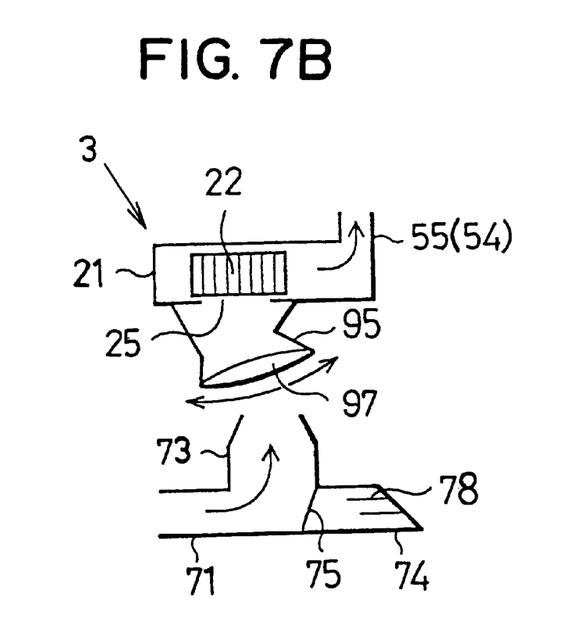
FIG. 7B is a schematic view showing a second example of a seat air-conditioner (fifth embodiment)

The blower unit casing 21 and the connection duct 90 vertically move with respect to the secondary flow grille 73 in accordance with the vertical stroke of the front seat 2. Here, as shown in FIG. 7B, a flexible connection duct 95 may be used for the connection duct 90. The flexible duct 95 is made of flexible rubber, is a good thermal insulator, and has an air inlet 97. The flexible duct 95 is cone cylindrically formed in such a manner that the opening area thereof gradually increases from the intermediate portion thereof through the air inlet 97. The flexible duct 95 moves in accordance with the front-back and vertical strokes of the front seat 2.

Modifications

In the above-described embodiments, the flexible slide walls 45, 46 partially forming the upper wall of the floor duct 41 or the flexible slide walls 93, 94 partially forming the bottom wall of the connection duct 90 are used to chase the front-back stroke of the front seat 2. Alternatively, a duct moving on a belt-conveyer or a duct sliding along a rail may be used.

In the above-described embodiments, the seat air-conditioning unit 3 is attached to the front seat 2. Alternatively, the seat air-conditioning unit 3 may be attached to a rear seat or an intermediate seat adjustable in the front-back and vertical directions. Further, the seat air-conditioning centrifugal fan may be provided outside the seat air-conditioning unit 3.

What is claimed is:

1. A vehicle seat air conditioner comprising:

a front air-conditioning unit generating conditioned air for a vehicle cabin; and a seat air-conditioning unit leading the conditioned air from said front air-conditioning unit to a passenger seat, said seat air-conditioning unit including a first mechanism following a substantial horizontal stroke of the passenger seat and a second mechanism following a substantial vertical stroke of the passenger seat independently; wherein:

the first mechanism has first means disposed between the front air-conditioning unit and the seat air-conditioning unit for allowing the seat air-conditioning unit to move in a substantial horizontal direction with respect to the front air-conditioning unit, and the second mechanism has second means disposed between the front air-conditioning unit and the seat air-conditioning unit for allowing the seat air-conditioning unit to move in a substantial vertical direction with respect to the front air-conditioning unit, said second means being separate from said first means.

2. A vehicle seat air conditioner according to claim 1, wherein:

said first mechanism includes an air duct leading the conditioned air from said front air-conditioning unit to said seat air-conditioning unit and having a flexible slide wall following the substantial horizontal stroke of the passenger seat, and said second mechanism includes a flexible duct leading the conditioned air from said seat air-conditioning unit to the passenger seat and following the substantial vertical stroke of the passenger seat.

3. A seat air conditioner according to claim 2, wherein:

said flexible duct maintains its shape when said flexible slide wall follows the substantial horizontal stroke of the passenger seat, and said flexible slide wall maintains its shape when said flexible slide ducts follows the substantial vertical stroke of the passenger seat.

4. A vehicle seat air conditioner comprising:

a front air-conditioning unit generating conditioned air for a vehicle cabin; and a seat air-conditioning unit including a seat air duct leading the conditioned air from said front air-conditioning unit to a passenger seat, said seat air duct including a first mechanism following a substantial horizontal stroke of the passenger seat and a second mechanism following a substantial vertical stroke of the passenger seat independently; wherein:

the seat air duct has a first air duct leading the conditioned air from said front air-conditioning unit and including a secondary flow grille at a discharge side thereof and a second air duct introducing the conditioned air into the seat air-conditioning unit;

the first mechanism has first means disposed between the second air duct and the secondary flow grille for allowing the second air duct to move in a substantial horizontal direction with respect to the secondary flow grille; and the second mechanism has second means disposed between the second air duct and the secondary flow grille for allowing the second air duct to move in a substantial vertical direction with respect to the secondary flow grille, said second means being separate from said first means.

5. A seat air conditioner according to claim 4, wherein:

said first mechanism includes an air duct leading the conditioned air from said front air-conditioning unit to said seat air-conditioning unit and having a flexible slide wall following the substantial horizontal stroke of the passenger seat, and said second mechanism includes a flexible duct leading the conditioned air from said seat air-conditioning unit to said passenger seat and following the substantial vertical stroke of the passenger seat.

6. A seat air conditioner according to claim 4, wherein:

said seat air duct leads the conditioned air from said front air-conditioning unit to said seat air-conditioning unit, said first mechanism includes a slide duct following the substantial horizontal stroke of the passenger seat, and said second mechanism includes a flexible duct following the substantial vertical stroke of the passenger seat.

7. A seat air conditioner according to claim 6, wherein:

said flexible duct maintains its shape when said slide duct follows the substantial horizontal stroke of the passenger seat, and said slide duct maintains its shape when said flexible ducts follows the substantial vertical stroke of the passenger seat.

8. A seat air conditioner comprising:

a front air-conditioning unit generating conditioned air for a vehicle cabin; and a seat air-conditioning unit including as eat air duct leading the conditioned air from said front air-conditioning unit to a passenger seat, said seat air duct including a first mechanism following a substantial horizontal stroke of the passenger seat and a second mechanism following a substantial vertical stroke of the passenger seat independently, wherein:

said seat air duct includes a first air duct leading the conditioned air from said front air-conditioning unit and having a secondary flow grille at a discharge side thereof, and a second air duct introducing the conditioned air into said seat air-conditioning unit, and said second air duct is allowed to slide with respect to said second flow grille in horizontal and vertical directions.

9. A seat air conditioner according to claim 4, wherein said seat air-conditioning unit includes a seat air-conditioning blower fan introducing the conditioned air toward said passenger seat.

10. A seat air conditioner according to claim 4, wherein said seat air-conditioning unit is fixed to a seat adjuster of the passenger seat.

11. A seat air conditioning system comprising:

a passenger seat moving in horizontal and vertical directions, said passenger seat defining a seat surface and including an air passage therein for leading conditioned air to the seat surface;

a front air-conditioning unit generating the conditioned air;

a seat air duct leading the conditioned air from said front air-conditioning unit to said passenger seat, and a connection member connecting said seat air duct to said passenger seat, said connection member including a first mechanism that allows the connection member to move with a substantial horizontal stroke of the passenger seat in a horizontal direction with respect to the seat air duct and a second mechanism that allows the connection member to move with a substantial vertical stroke of the passenger seat in a substantial vertical direction with respect to the seat air duct.

12. A seat air conditioning system according to claim 11, wherein:

said first mechanism maintains its shape when said second mechanism follows the substantial vertical stroke of the passenger seat, and said second mechanism maintains its shape when said first mechanism follows the substantial horizontal stroke of the passenger seat.

13. A vehicle seat air conditioner comprising:

an air conditioning unit for generating conditioned air for a vehicle cabin;

a floor duct for leading the conditioned air from the air-conditioning unit and discharging the conditioned air from an outlet thereof;

a connection duct coupled with the floor duct at an air inlet thereof and having a seal member closing the inlet, the seal member having a slit through which the outlet of the floor duct extends thereby to allow the connection duct to move in a horizontal direction and in a vertical direction while receiving the outlet of the floor duct in the connection duct; and a blower unit coupled to a passenger seat for air-conditioning the passenger seat by the conditioned air supplied from the air-conditioning unit through the floor duct and the connection duct.

14. The seat air conditioning system according to claim 11, wherein the first and second mechanisms introduce the conditioned air into the passenger seat and are constructed of one of:

a flexible duct freely expanding and contracting;

a pair of flexible ducts that slide independently from each other;

a pair of ducts that are opposite to each other through a flexible seal member to restrict the conditioned air from leaking; and a combination of a cover and a duct opposite to each other through a clearance, the duct being inserted in the cover.

* * * * *